US008762323B2

(12) United States Patent
Moon et al.

(10) Patent No.: US 8,762,323 B2
(45) Date of Patent: Jun. 24, 2014

(54) REPLICA BASED LOAD BALANCING IN MULTITENANT DATABASES

(75) Inventors: Hyun Jin Moon, Newark, CA (US); Wang-Pin Hsiung, Santa Clara, CA (US); Vahit Hakan Hacigumus, San Jose, CA (US); Yun Chi, Monte Sereno, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 114 days.

(21) Appl. No.: 13/270,218

(22) Filed: Oct. 10, 2011

(65) Prior Publication Data

US 2012/0265741 A1 Oct. 18, 2012

Related U.S. Application Data

(60) Provisional application No. 61/441,300, filed on Feb. 10, 2011, provisional application No. 61/479,903, filed on Apr. 28, 2011.

(51) Int. Cl.
*G06F 17/30* (2006.01)
(52) U.S. Cl.
USPC ........................................................ 707/602
(58) Field of Classification Search
USPC ........................................................ 707/602
See application file for complete search history.

(56) References Cited

U.S. PATENT DOCUMENTS

2006/0239207 A1* 10/2006 Naghian ....................... 370/254

OTHER PUBLICATIONS

Sudaram et al. Efficient Data Migration in Self-managing Storage System, International Conference on Automatic Computing (ICAC), 2006, pp. 1-4.*
Shankar, R., and P. Dananjayan. "An adaptive call admission control scheme with load balancing for QoS enhancement in converged UMTS/WLAN." Proceedings of 5th International Conference on Communications and Information Technology. 2011.*
You, Gae-won, Seung-won Hwang, and Navendu Jain. "Scalable load balancing in cluster storage systems." Proceedings of the 12th International Middleware Conference. International Federation for Information Processing, 2011.*
V. Sundaram, T. Wood, P. Shenoy. Efficient Data Migration in Self-managing Storage Systems. International Conference on Autonomic Computing (ICAC) 2006.

* cited by examiner

*Primary Examiner* — Baoquoc N To
(74) *Attorney, Agent, or Firm* — Joseph Kolodka

(57) ABSTRACT

A swap-based multitenant database load balancing (SWAT) invention finds an optimal swap set that eliminates hotspots, and finds a sequencing and parallelization of swap executions for the multitenant database.

10 Claims, 5 Drawing Sheets

REPLICA BASED LOAD BALANCING IN MULTITENANT DATABASES

The present application claims priority to Provisional Application Ser. Nos. 61/441,300 filed Feb. 10, 2011 and 61/479,903 filed Apr. 28, 2011, the contents of which are incorporated by reference.

BACKGROUND

The application relates to load balancing for multi-tenant databases.

Cloud computing has revolutionized the IT industry, with the promises of on-demand infrastructure. The success of cloud service providers mainly depends on economies of scale, where the workload consolidation is a key factor. Cloud services for databases have successfully adopted this strategy of consolidation, where multitenant databases are one of the key enablers. For example, one of the studies in multitenant DBs has reported between 6:1 and 17:1 of workload consolidation. Because of such great potentials, in recent years, multitenant DBs have received much interests from the database research community. Extensive research has been conducted on topics such as exploration on the replication and consistency, DB multitenancy options, in-memory multitenant DB, hotspot mitigation through live migration, and multitenant SLA management.

Multitenant databases achieve cost efficiency through consolidation of multiple small tenants. However, performance isolation is an inherent problem in multitenant databases due to the resource sharing among the tenants. That is, a bursty workload from a co-located tenant, i.e. a noisy neighbor, may affect the performance of the other tenants sharing the same system resources.

When a tenant receives an increased workload, either temporarily or permanently, the neighbor tenants within the same server will suffer from the increased total workload. There can be many causes for the increased workload, where some examples include: i) the growth of a company, leading to a permanent traffic growth, ii) predicted infrequent traffic changes of a tenant, e.g. the bursty query traffic at a Web site dedicated to the World Cup, iii) predicted frequent traffic changes, such as daily or weekly workload pattern of a company, iv) unpredicted traffic spikes by a flash crowd, or any combination of these. Whatever the causes or the patterns are, the impact of such overloading can be highly damaging: neighbors of a noisy tenant can immediately see violations on their performance Service Level Agreements (SLAs), and in a severe case, the server and all tenants therein may become unresponsive.

To avoid this problem, some well-known workload management techniques can be used, including admission control and query scheduling. Admission control rejects certain queries based on some criteria, such as server capacity or per-tenant SLAs. Although server overloading can be avoided with admission control, a portion of workload would be rejected. Query scheduling is another method, which delays certain queries based on the scheduling policies of choice, such as simple First-come-first-served (FCFS) or more sophisticated SLA-based scheduling policies. Scheduling may work nicely with a short transient overload, but it cannot resolve a prolonged overload.

Compared to these methods, load balancing is better suited for addressing non-transient workload overloading due to workload unbalance. One commonly used method for load balancing is through data migration, which moves one or more tenants from an overloaded server to another with a lower resource utilization. Unfortunately, migration involves costly data movement, especially within the shared-nothing environment of our interest. First, data movement consumes resources on the source and the destination servers, along with network bandwidth, which temporarily elevates the resource contention on all of them. Second, data movement takes time proportional to the data size, as the data of a tenant has to be completely moved to a new server before the load balancing can be achieved.

SUMMARY

In one aspect, systems and methods are disclosed for a swap-based multitenant database load balancing by generating a replica swap operator to achieve a load transfer with minimal service interruption; determining an optimal set of swap operators that minimizes a total cost; and sequencing swap operators to minimize or avoid temporary overloads.

In another aspect, systems and methods are disclosed for a swap-based multitenant database load balancing (SWAT) by finding an optimal swap set that eliminates hotspots, and finding a sequencing and parallelization of swap executions for the multi-tenant database.

Advantages of the preferred embodiments may include one or more of the following. In the instant load balancing method based on database replica swap, replica swap-based load balancing does not incur data movement, which makes it highly resource- and time-efficient. The method that chooses the optimal set of tenants allows swaps to achieve load balancing across the system. Service Level Agreements (SLAs) are used as the main quality metric by observing the service provisioning spirit of majority of the offerings that employ multitenancy. Therefore, SLA violations is the key metric for evaluating the performance of the instant methods and comparisons. Simulation results show that swap-based load balancing reduces SLA violations by a factor of 7 and leads to a well-balanced multitenant database systems with good performance isolation.

In comparison, the conventional migration-based load balancing incurs the penalty of resource consumption involved in data movement, affecting the workload performance. It also takes long to resolve overload, since the data movement should be finished. The present replica swap-based load balancing avoids both, achieving much faster and more lightweight load balancing. Because of these characteristics, one can apply load balancing more often, keeping the whole system much more stable.

DESCRIPTION

In multi-tenant databases, two or more databases are consolidated into a single server, for the purpose of cost efficiency. In this architecture, each tenant may potentially experience quality of service compromised due to the overload caused by neighbor tenants.

In most of mission critical multi-tenant databases, each tenant database has a secondary replica, maintained on a separate server for fault tolerance purpose. Hence servers have some primary replicas and some secondary replica mixed, in general. In one embodiment, all read and write workloads go to the primary replica, and only the write workloads are propagated to the secondary replica. Naturally, the workload over the secondary replica is less than that of the primary.

A load balancing method called SWAT (Swap-based load balancing method) is disclosed that uses a database workload migration method called database replica swap. In most of today's database deployments in cloud oriented data center environment, databases come with one or more secondary replicas for fault tolerance and high availability purposes. Often times, primary replicas serve both read and write queries and secondary replicas receive the updates relayed from the primary replica for the purpose of fault tolerance. Hence primary replicas serve higher amount of workload compared to the secondary replicas: For example, in one exemplary environment, read queries incur zero load on any resources on the secondary replicas and write queries incur about one fourth of the primary's I/O on the secondary. The system can leverage this for workload migration: by swapping the roles of the primary and the secondary replicas, workload can be effectively moved, up to the difference between the workloads at the two replicas. This fast and lightweight workload migration based on replica swap as a basic operator is the basis for the load balancing method, SWAT. For an individual tenant, the destination of workload migration is fixed as the location of secondary replica. Given this restriction, a subset of tenants is selected for replica swap to achieve the desired level of load balancing across the system.

Figure 1A:
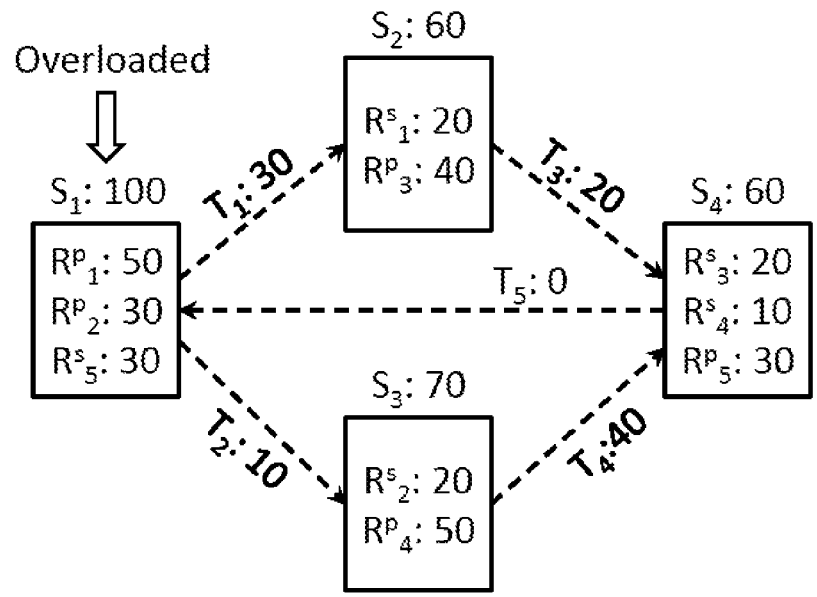
FIG. 1A shows an exemplary multi-tenant database system with an overloaded server.
Figure 1B:
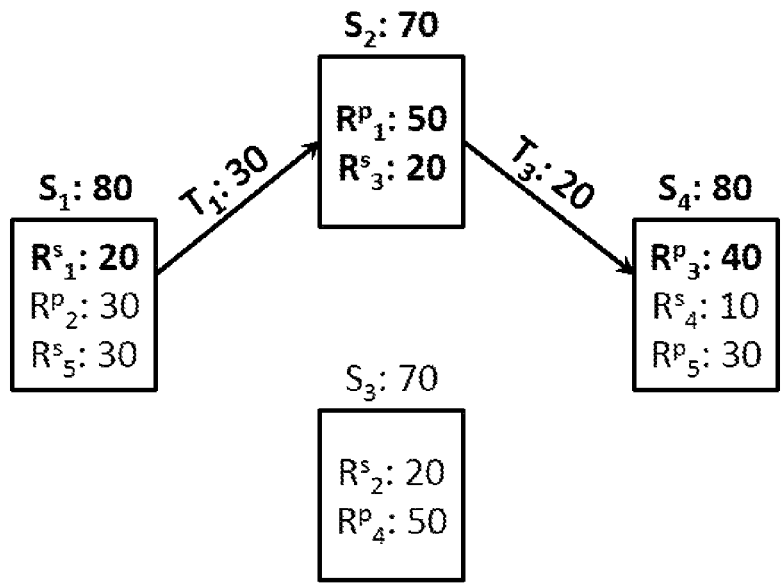
FIG. 1B shows a replica based load-balanced system.

FIG. 1A and FIG. 1B shows an example of swap-based load balancing. In FIG. 1A, Server S1 is oveloaded with a resource request of 110% of capacity, wherein servers S2 is operating at 60% of capacity, S3 at 70% capacity and S4 at 60% capacity. FIG. 1B shows an exemplary swap-based load balancing applied on FIG. 1, by swapping tenants T1 and T3.

In this example, five tenants, $T_1$ through $T_5$ are placed on four different servers, $S_1$ through $S_4$. Each tenant $T_i$ has a primary replica, $R_i^p$, and a secondary replica, $R_i^s$. For brevity, a single resource example is used here, and the number next to the server and replica labels represent their respective load, e.g. IO, out of 100, the server capacity. The labels next to the edges (e.g. $T_1$:55) represent the potential load transfer when the swap on the corresponding tenant is executed. A server whose total load is higher than a threshold a hotspot and try to reduce the loads of hotspots through load balancing. In the example, the hotspot threshold is set at 80.

FIG. 1A shows that the server $S_1$ (with the load 100) is a hotspot to eliminate, according to the hotspot threshold of 80. One of the possible solutions is to swap the two replicas of $T_2$ at $S_1$ and $S_3$, effectively transferring the load difference of 30 from $S_1$ to $S_3$. If this swap is adopted, all servers' loads are below the hotspot threshold of 80.

Next, for the sake of explanation, we assume that for some reasons it is not possible to swap the replicas of the tenant $T_2$, e.g. due to the primary-secondary log gap limit criteria mentioned above. Under such a restriction, another solution is possible, as shown in FIG. 1B. The two replicas of $T_1$ at $S_1$ and $S_2$ are swapped, and also the two replicas of $T_3$ at $S_2$ and $S_4$ are swapped. After swapping $T_1$'s replicas, the system eliminates the hotspot of $S_1$ (i.e. from 100 to 50), but there is another hotspot at $S_2$ (i.e. from 55 to 110). In order to eliminate this new hotspot, the system also swaps the replicas of $T_3$, effectively transferring the load difference of 45 from $S_2$ to $S_4$.

Note that $S_4$'s new total load of 75 is below the threshold, which makes it a valid solution.

A swap operator, which swaps the roles of two replicas, is used so that the primary replica becomes a secondary, and the secondary becomes a primary. An execution of swap operator has a net effect of load reduction on the server with the primary replica, so this operator is used for load balancing purpose. Given the hotspots in the system, a set of swap operators is determined that eliminate the hotspots when applied. In doing so, a solution that minimizes the total cost is used. The total cost is the sum of write workloads of swapped tenants: each swap will interrupt service of write queries during the swap execution, which is small time window, but desired to minimize as much as possible. The problem can be formalized using integer linear programming and optimally solved with ILP solver.

The system carefully sequences the obtained set of swap operators, to avoid temporary overload of any server during the swap execution. The system also parallelizes the execution as much as possible, to minimize the time to hotspot resolution.

The SWAT load balancing method chooses a subset of tenants to swap to achieve a desired load balancing in an optimal manner. The SWAT method utilizes the replica swap operation for the fast and lightweight role changes between a primary and a secondary. SWAT consists of three subprocedures: i) load leveling that removes all hotspots and achieves balanced load across servers, ii) hotspot elimination that just eliminates all hotspots, and iii) hotspot mitigation, where overload is minimized rather than removed. Each subproblem can be solved as a integer linear programming problem. Once the system finds a set of tenants to swap, the system needs to execute them in a certain order. This order needs to be carefully designed, otherwise it may create temporary overloads during the execution. Also, it is desired to execute some swaps in parallel when possible. The system uses a swap sequencing and parallelization algorithm that minimizes temporary overload during the swap execution using the right level of parallel swap executions.

The effectiveness of SWAT has been proven, using TPC-W database and multitenant workload driven by the real world trace of Yahoo Video website. The SWAT system is highly effective on SLA violation reduction compared to that of no load balancing case and migration-based load balancing.

Figure 3:
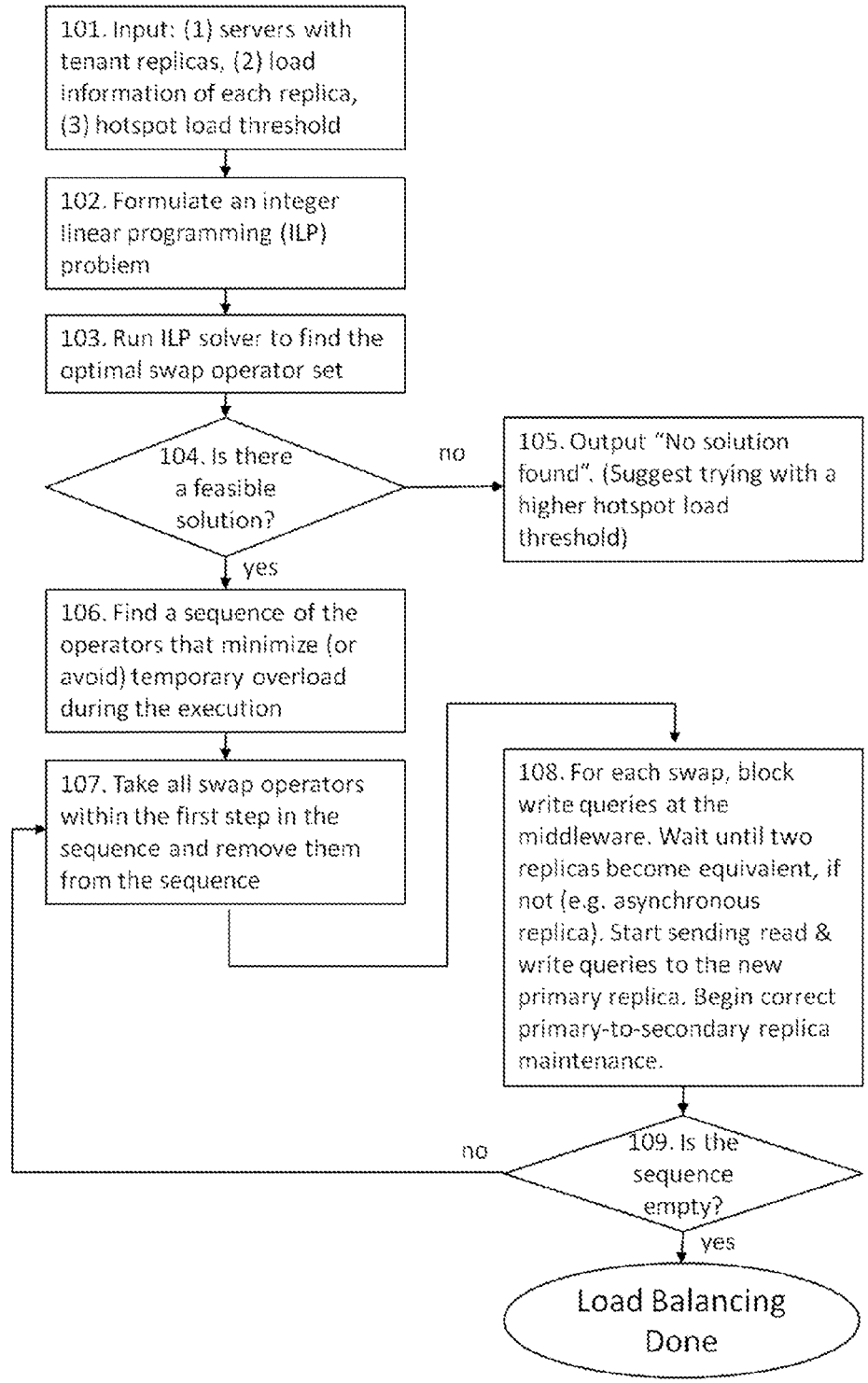
FIG. 3 shows a second exemplary SWAT flowchart.

FIG. 3 shows an exemplary process to perform replica swap-based load balancing. The process receives as inputs servers with tenant replicas, load information for each replica, and hotspot load threshold (101). The process formulates an integer linear programming (ILP) problem (102). The process then runs an ILP solver to find an optimal swap operator set (103). The process determines if a feasible solution exists (104). If not, the process indicates failer (105). Alternatively, if feasible, the process finds a sequence of operators that minimize or avoid temporary overload during execution (106). Next, the process takes all swap operators within the first step in the sequence and remove them from the sequence (107). In (108), for each swap, the process block write queries at the middleware. The process waits until two replicas become equivalent and starts sending read and write queries to the new primary replica and begins maintenance of the correct primary to secondary replica maintenance. In (109), the process checks if the sequence is empty and if not loops back to (107). Alternatively, the load balancing is done and the process exits.

Figure 4:
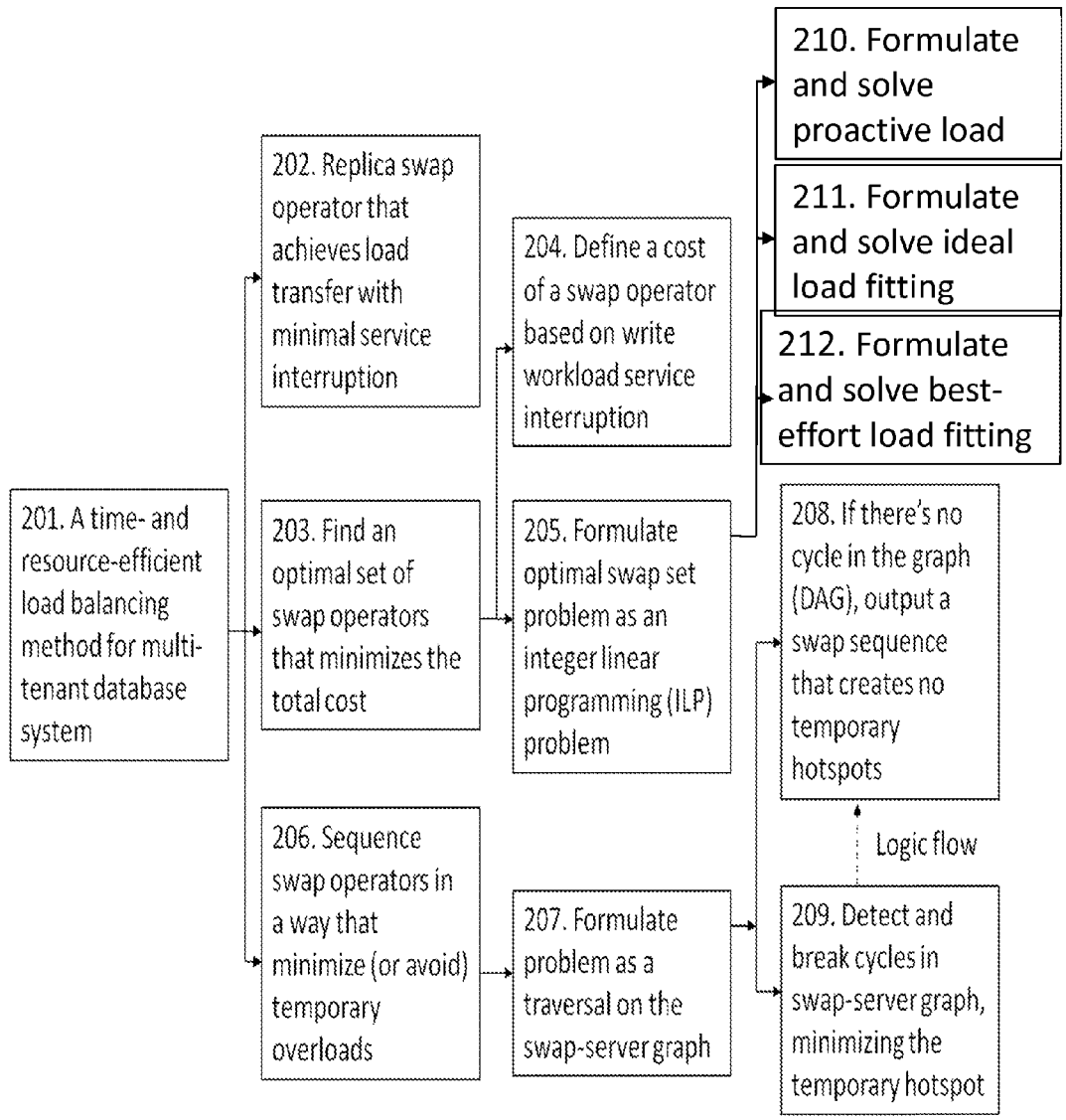
FIG. 4 shows a third exemplary SWAT flowchart.

FIG. 4 shows an exemplary method for time-and resource-efficient load balancing of a multitenant database system (201). The process determines a replica swap operator that achieves load transfer with minimal service interruption (202). The process determines an optimal set of swap operators that minimizes the total cost (203). The process also determines a sequence of swap operators that minimize or avoid temporary overloads (206).

From (203), the process defines a cost of a swap operator based on write workload service interruption (204). The process also formulates the optimal swap set as an integer linear programming (ILP) problem (205). From (205), the process includes formulating and solving a proactive load balancing problem (210), formulating and solving an ideal load fitting problem (211), or formulating and solving a best-effort load fitting problem (212).

From (206), the process can formulate a traversal on a swap-server graph (208). The process then generates a swap sequence that creates no temporary hotspots if there is no cycle in the swap server graph (208). The process also detects and breaks cycles in the swap-server graph to minimize a temporary hotspot (209).

Figure 5:
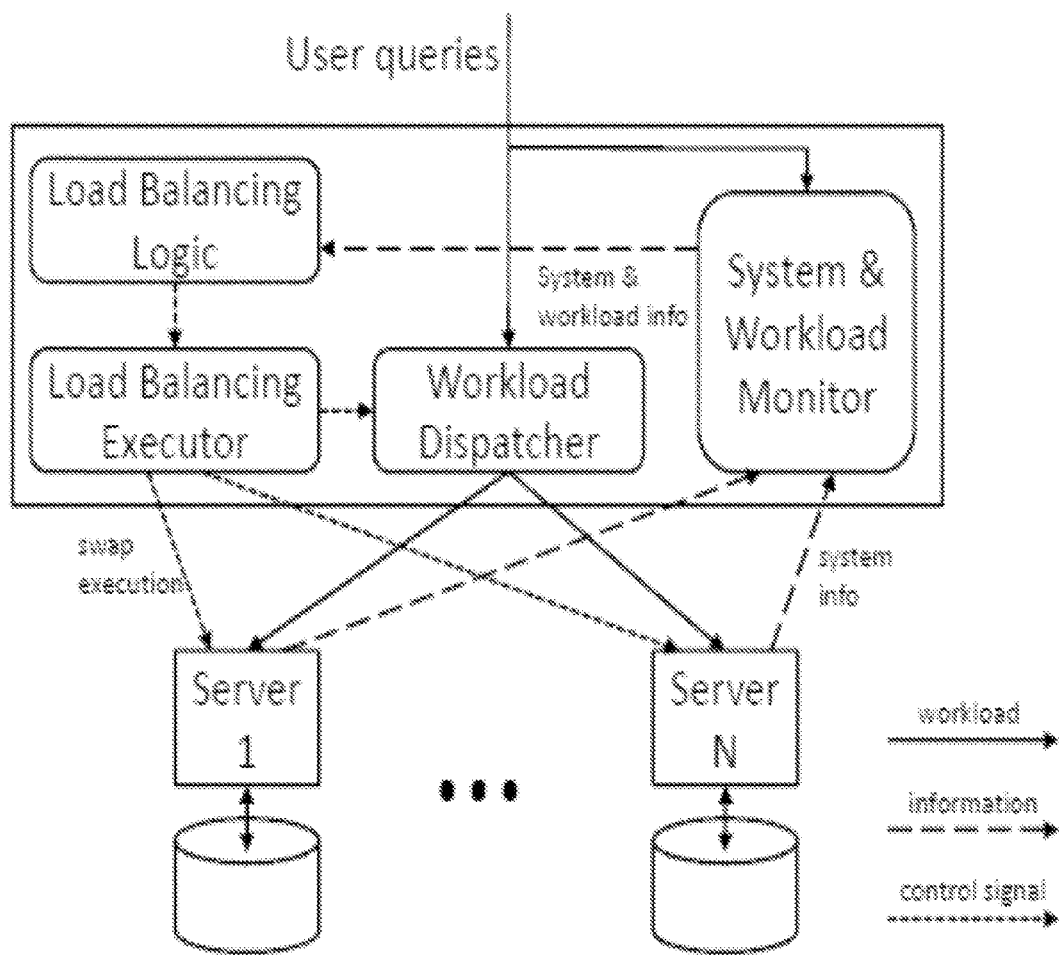
FIG. 5 shows an exemplary computer with a multi-tenant database.

FIG. 5 shows an exemplary system architecture. Database servers have shared-nothing architecture. A user workload arrives at the middleware layer, where workload dispatcher routes it to the right DB server. The system and workload monitor constantly observes the workload level for each tenant and each server and sends the information to load balancing logic, which periodically runs the load balancing algorithms we present in the paper and sends a sequence of swap operators to be executed to the load balancing executor. The executor runs the given swap operators sequentially or in parallel as specified, achieving the load balanced system.

In one exemplary system with multitenant database systems over a set of homogeneous servers, direct attached storage (DAS), or shared-nothing architecture, were used rather than network attached storage (NAS) or shared-disk architecture.

Various multitenant architecture options, such as private virtual machines, private instances, private databases, private tables, and shared tables, can be used. Each option has pros and cons: private VMs have best isolation, at the cost of high resource overhead, while shared instances (i.e. private DB, private tables, and shared table) have poor isolation, but allows for low overhead and high consolidation factor. One embodiment uses the private instance model, currently used in Microsoft SQL Azure and Amazon RDS, which have both reasonable performance isolation and the good consolidation factor.

In one embodiment, each tenant has one primary replica and one secondary replica for the purpose of fault tolerance. The primary replica serves all the queries (both read and write queries), while the secondary replica executes the update logs relayed from the primary replica, in an asynchronous manner. Asynchronous replica is better for its lightweight overhead on the query performance: 2PC-based synchronous replication may result in 5% to 25% of throughput decrease, which is a non-negligible performance penalty. However, asynchronous replica is vulnerable to data loss at the failure of primary replica.

This embodiment avoids the use the secondary replica for read query answering. While it is a useful feature for read query scalability and load balancing, allowing read queries at the secondary replica has been shown to reduce the overall multitenant system throughput, because it requires the data be maintained in the memory buffer in two servers.

The load of a tenant is the amount of server resources needed to serve the tenant's workload, as a percentage of the server capacity. The load information of each tenant replica to be given as a problem input.

Table 1 shows the important system parameters used herein. Some of important assumptions are as follows. First, $N \geq M$ as described above. Second, for a given tenant $T_i$, its primary replica's load is always greater than or equal to its secondary replica's load, i.e. $L_i^P \geq L_i^s$. Note that $L_i^s=0$ when $T_i$ has no write query workload.

TABLE 1

| | Notations |
|---|---|
| N | Number of tenants |
| M | Number of servers |
| $T_i$ | i-th tenant |
| $T_R$ | Tenant of replica R |
| $R_i/R_i^P/R_s^i$ | Any/primary/secondary replica of $T_i$ |
| $R_{S_j}$ | The set of all replicas at server $S_j$ |
| $S_j$ | j-th server |
| $S_R$ | Server location of a replica R |
| $L_{i,r}/L_{i,r}^P/L_{i,r}^s$ | Load of $R_i/R_i^P/R_i^s$ on resource r, e.g. CPU, IO. |
| $L_{TH}$ | Hotspot threshold |
| $x_i$ | Var. for swapping $T_i$ (1: swap, 0: no swap) |

To determine system capacity, or hotspot threshold, a queueing-theoretic approach is used where a controlled experiment is run on a single server, with varying load levels. As the system increases the arrival rate, a critical point is located where the query response time explodes, and this load level is used as the hotspot threshold.

Multitenant databases are often considered in the service and/or cloud provisioning, due to their nature of consolidation. The end-users are often far from the multitenanted service provider, and it is desired for them to have relevant high-level SLAs, rather than low-level best effort guarantees on raw metrics. Hence, we focus on SLA performance in terms of query response time. Therefore the desired level of service, i.e., response time, defines the provider's Service Level Objective (SLO) and the provider tries to conform to the SLOs. We use the SLO achievement/violation as our main performance metric. To be more specific, we count how many queries had a response time greater than the SLO of x second, where we experimented with a range of x values.

A swap-based multitenant DB load balancing, SWAT, consists of two subcomponents: i) finding the optimal swap set that eliminates hotspots, and ii) finding the sequencing and parallelization of swap executions.

Figure 2A:
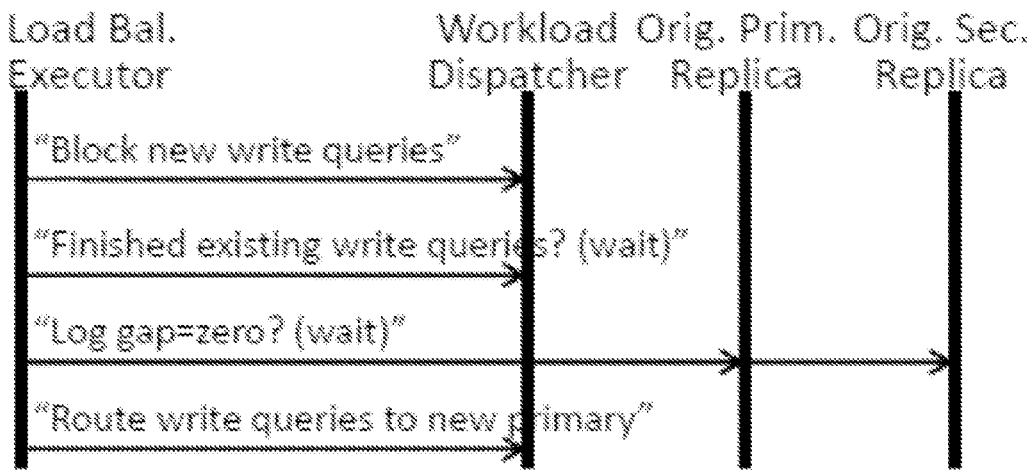
FIG. 2A shows a block diagram of a swap procedure.
Figure 2B:
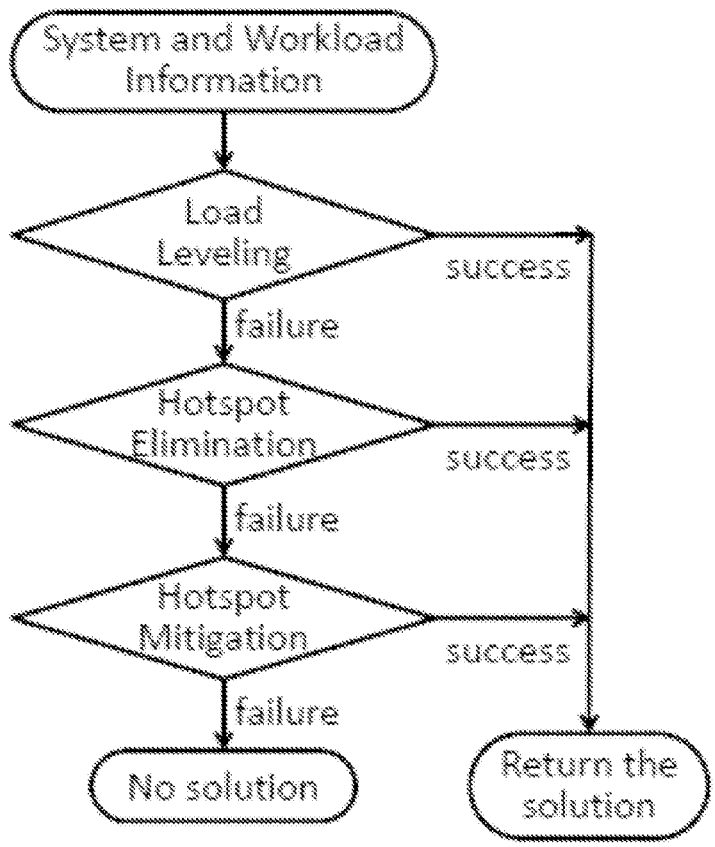
FIG. 2B shows one exemplary SWAT flowchart.

Given a tenant that has a primary replica and a secondary replica, the replica swap involves the following steps, outlined in FIG. 2. The middleware first temporarily holds the incoming client query write workloads in its per-tenant queue, and allow the write queries running in the DBMS finish and retire from the system. After that, it waits until the relay log at the primary replica (i.e. asynchronous delta) propagate to the secondary and two replicas are synchronized. This may take varying amount of time, depending on the log gap between two replicas (see below) and the system utilization at the two nodes, while it is quite fast in general from our experimental study. Note that these two steps ensure the correctness of transactions. Finally, the roles of the primary and the secondary replicas are swapped and the workload dispatcher starts to send the read and write queries waiting in the queue to the new primary replica, which used to be a secondary replica before the swap. The new secondary replica starts to fetch log records from the new primary replica in an asynchronous manner.

Under a write-intensive workload, a secondary replica may not be able to catch up the primary replica, especially when the secondary replica is located in a overloaded server and cannot catch up the speed of the primary replica's write query executions. In this case, the log gap may keep increasing between the primary and the secondary.

To address this, the system first checks the log gap of all secondary replicas against their primary, and eliminate those with log gaps higher than a specific threshold from the swap candidate list. The system parallelizes these checks for tenants to minimize the latency. The load balancing algorithm then uses the tenants that pass the test for finding the load balance solution. While this screening reduces the flexibility of the load balancing algorithm, it does not seem to affect the load balancing quality much, for the following reason: the tenants with high log gaps often have their second replicas in the overloaded servers, which means that swapping those tenants does not directly reduce the load levels of the overloaded servers.

Next, the determination of a subset of tenants for replica swap that achieves the desired load balancing effect is discussed. The system divides the problem into three hierarchical levels, where a level subsumes the solution of the level(s) below. In FIG. 3, the system tries load leveling where the system seeks to balance the load regardless of whether there is an overloaded server or not. If this succeeds, then the algorithm terminates successfully with the found solution. Othwerwise, i.e. balanced load is not achievable, the system tries hotspot elimination for removing overloads at all servers given the hotspot threshold. If this succeeds, then again the algorithm successfully terminates. Otherwise, the system invokes a third component, hotspot mitigation to reduce the load level at the overloaded servers to the minimum possible, while keeping the non-overloaded servers not overloaded.

Next, hotspot elimination is discussed, which is most straightforward and ideal for illustration purposes. Hotspot elimination aims at eliminating all overloaded servers, i.e. servers whose aggregate load is above the hotspot threshold, through replica swap. To be more specific, it finds a set of swaps that removes overloads at all servers, if possible, while minimizing the total amount of workload being interrupted by the swap.

The present solutions that minimally affect the tenant workloads in the sense that the sum of workload interrupted by the swap is minimized. This is important because a swap requires the asynchronous replica's delta catchup for full synchronization and therefore a swap introduces a short service interruption during the full synchronization. The level of such impacts is proportional to the amount of write workload, which is equivalent to the secondary replica's load. Hence, the optimal hotspot elimination problem is formulated as:

Definition 1 Hotspot elimination problem finds a set of swaps that resolve the hotspots given a threshold, while minimizing the sum of secondary replicas' workload for the swapped tenants.

Definition 2 Swap load impact LoadImpact($T_i,S_j,r$) is the potential load difference at the server $S_j$ caused by swapping the replicas of a tenant $T_i$ at $S_j$, on the resource r, e.g. CPU or IO. LoadImpact($T_i,S_j,r$)=$L_{i,r}^s-L_{i,r}^p \leq 0$, if $S_j$ has a primary replica of $T_i$, and $L_{i,r}^p-L_{i,r}^s \geq 0$, if $S_j$ has a secondary replica of $T_i$.

For example, assume a tenant $T_1$ has a primary replica of CPU load 60 located at $S_1$, and a secondary replica of CPU load 20 at $S_2$. Then, LoadImpact($T_1,S_1$,CPU)=−40 and LoadImpact($T_1,S_2$,CPU)=40.

In the optimal swap set problem, the system finds a binary variable assignment for $x_i$, (1≤i≤N), where $x_i$=1 means $T_i$ is swapped and $x_i$=0 means otherwise, so as to $$\min \sum_{i=1}^{N} L_{i,max}^s \times x_i, \text{ where } L_{i,max}^s = \max_r L_{i,r}^s \quad (1)$$

subject to $$\sum_{R \in R_{S_j}} [x_R * LoadImpact(T_R, S_j, r) + L_R] < L_{TH} \quad (2)$$

for each resource type r, where $x_i \in \{0, 1\}$

Equation (2) says that there should be no hotspot in any of servers. $x_R$ refers to the $x_i$ of the replica R's tenant $T_i$.

Example Following is the problem formulation for the example given in FIG. 3.2.1:

$$\min(5x_1 + 5x_2 + 5x_3 + 5x_4 + 5x_5)$$

$$\begin{bmatrix} -55 & -30 & 0 & 0 & 15 \\ 55 & 0 & -45 & 0 & 0 \\ 0 & 30 & 0 & -20 & 0 \\ 0 & 0 & 45 & 20 & -15 \end{bmatrix} \begin{bmatrix} x_1 \\ x_2 \\ x_3 \\ x_4 \\ x_5 \end{bmatrix} + \begin{bmatrix} 100 \\ 55 \\ 40 \\ 30 \end{bmatrix} < \begin{bmatrix} 80 \\ 80 \\ 80 \\ 80 \end{bmatrix}$$

$$x_1, x_2, x_3, x_4, x_5 \in \{0, 1\}$$

While this binary integer linear programming problem (BILP) is NP-complete, in practice it often can be solved using highly efficient open source ILP solvers, such as lp_solve.

While it is desired to eliminate all hotspots, there are cases where it is simply not possible to achieve. Consider the example in FIG. 3. There are two servers with the loads 160 and 20. Given a hotspot threshold of 80, there is no feasible solution for eliminating the hotspot without an additional server. In this case, our hotspot elimination problem would report that there is no feasible solution.

However, it is still valuable to decrease the overload degree of the hotspot server. In FIG. 3, one tenant can be swapped, reducing the load of hotspot from 160 to 105, while keeping the other server still non-overloaded, at the load of 75. This action is beneficial since the swapped tenant would not be affected by the overload anymore, and the remaining tenants there would also see reduced overloading, which would somewhat improve the performance.

To achieve this, the system drops the hotspot removal constraints, i.e. Eqn 2, for the overloaded server-resources, while keeping the constraints for the original non-overloaded server-resources. Second, we change the objective function of Eqn 1 into the sum of load impacts of all overloaded server-resources. With these changes, the system minimizes the overloading, rather than strictly requiring the overloading to be removed. Below is the modified problem formulation.

$$\min \sum_{R \in R_{S_j}} [x_R * LoadImpact(T_R, S_j, r) + L_R] \quad (3)$$

for all currently overloaded resource type r of $S_j$, subject to $$\sum_{R \in R_{S_j}} [x_R * LoadImpact(T_R, S_j, r) + L_R] < L_{TH} \quad (4)$$

for all non-overloaded resource type r of $S_j$, with binary $x_i$.

It may, however, be desirable to take a proactive action even before a hotspot is detected: whenever there's some load unbalance among the servers, try to balance them. To achieve such load leveling, we design an algorithm as outlined in Algorithm 3.3.

First, we see if there's a significant load unbalance, using a load skew limit, e.g. 50%: if the load of a server is greater than the average load of all servers by the load skew limit or more, or lower than the average by the load skew limit or more. Consider the example in FIG. 3. Two servers originally have the loads of 70 and 10, respectively. With the average load of 40 and load skew limit of 50%, we observe load unbalance, i.e. 70/40=1.75>1.5 and 10/40=0.25<0.5.

Second, the load skew is minimized as follows. The ILP solver is run in a very similar manner as above, but with a minor difference on the constraints, i.e. Eqn 2. Rather than using a hotspot threshold as the constraint right hand side, the average load times the target load skew limit, is used. When this constraint is greater than the hotspot threshold, the hotspot threshold is used instead.

There's a cost-benefit tradeoff involved in load leveling, as in any proactive or preventive action in general: the system takes an action to avoid or lessen a problem, before it actually happens. The action itself has a small cost associated, and so the benefit of the load leveling action depends on the likelihood of the overload on the currently high—(but not over—) loaded servers, which in turn depends on the specific workload pattern. In our case, swap operator has a very small cost in terms of SLO violation induced by it, so the proactive approach is a good thing to do in general.

In one embodiment, the system assumes that each tenant has exactly one secondary replica. In other embodiments, because a DB service provider may use more secondary replicas or a tenant may be allowed to choose its own number of secondary replicas at different service prices.

With a higher number of secondary replicas, replica swap-based load balancing becomes more powerful as there are more swap choices for each tenant. support this with the following extension of problem formulation. Instead of using one swap decision variable $x_i$ for each tenant $T_i$, a variable $x_{i,k}$, is used for k-th secondary replica $R_i^{s,k}$ of Tenant $T_i$·$x_{i,k}$=1 means swapping $R_i^{s,k}$ with $R_i^p$ and $x_{i,k}$=0 means no swapping for $R_i^{s,k}$.

Since the primary replica can be swapped with only one of the secondary replicas, the following constraint is added for each tenant:

$$\sum_{k=1}^{K_i} x_{i,k} \leq 1 \quad (5)$$

where $K_i$ is the number of secondary replicas of tenant $T_i$.

$x_R$ in the original problem formulation's constraints is replaced with $x_{i,k}$ if R is a secondary replica, or $$\sum_{k=1}^{K_i} x_{i,k},$$

if R is a primary replica.

---

Algorithm 1: Load Leveling

```
Input  : Workload information and current tenant placement
Input  : Hotspot threshold L_TH
Input  : Load skew limit F, e.g. 1.5
Input  : A list of load skew limit target values F_tgt, e.g. 1.1,
         1.3, 1.5
Output: A set of swap operators
L_avg ← average of all servers loads
flag ← false foreach S_j of all servers do
|  if L_Sj > F_tgt × L_avg then
|  |  flag ← true
|  end
end
if flag is false then
|  return 'no action needed'
end
foreach F_t of F_tgt do
|  Solution ← Hotspot elimination solution with Eqn 2's rhs
|  as min(L_avg × F_t, L_TH)
|  if Solution is feasible then
|  |  return Solution
|  end
end
return 'no feasible solution'
```

---

Algorithm 2: Swap Sequencing and Parallelization

```
Input  : Swap operators SW_i, 1 ≤ i ≤ N_sw, that form DAG
Input  : A set of servers S_sink involved in SW_i, 1 ≤ i ≤ N_s
Output: SwapOpSequence[j]
for j ← 1 to N_s do
|  if S_j has no outgoing-edge swap then
|  |  Add S_j to the set S_sink
|  end
end
while S_sink ≠ ∅ do
|  foreach S_j in S_sink do
|  |  Pick an incoming-edge swap SW_i and append it to
|  |  SwapOpSequence[j]
|  |  Remove SW_i from its destination server S_j and the
|  |  source server S_j2.
|  |  If S_j has no incoming edge, remove it from S_sink.
|  |  If S_j2 has no outgoing edge, add it to S_sink.
|  end
|  Append a null to SwapOpSequence[j], which means a
|  parallel execution boundary.
end
```

Next, swap sequencing and parallelization are discussed. Once the system found the optimal swap set, the system needs to execute them in a certain sequence. However, random execution order may create undesirable temporary hotspots during the swap executions. Another issue is parallel execution. Since a sequential execution of all swaps may take too long to finish load balancing, parallel execution is desired. However, some swaps, when executed in parallel, may again create some temporary hotspot as above, in a non-deterministic fashion.

The system minimizes, or avoids if possible, the temporary hotspots during the operator execution, while minimizing the number of sequential steps through parallelization. The key idea is to execute all swap operators in parallel that will not make their destinations (i.e. the server with the secondary replica) overloaded.

To solve this problem, one embodiment first constructs a workload transfer graph as follows: the system models the servers as vertices in a graph and an operator that swaps a primary replica at server $S_i$ and a secondary replica at server $S_j$ as an edge from $S_i$ to $S_j$. The label of the edge is the corresponding load difference, i.e. primary replica's load minus secondary replica's load. The system traverses the workload transfer graph in a reverse order: in each iteration, the system takes all the sink nodes of the graph and executes all the swaps that transfer workload into the sink nodes, since the sink nodes do not get overloaded even with these load increases. Also all these swaps can be executed in parallel as they do not create overload. The system moves on to the next iteration with the newly created sinks by removing the swap-edges executed in the previous iteration, and keep traversing the graph toward the original hotspots, resolving them in the end.

When there are cycles within the graph, the system first finds and removes cycles, and then apply the DAG swap sequencing. Cycles are detected using Tarjan's algorithm. For each cycle, the system computes the expected total load $L_{new}$ of each server node comprising the cycle when all incoming-edge swaps are executed. Among those nodes, the system finds the one with the lowest $L_{new}$ and apply all its incoming-edge swaps, and breaks the cycle.

The algorithm creates a load balance solution instance, which consists of a sequence of swap batches. Each swap batch contains one or more swap operators that run in parallel. When all swap operators within a batch finish, the next swap batch starts execution. When all batches finish, the load balancing solution instance is finished.

As discussed above, SWAT is an efficient load balancing method for multitenant databases. Using replica role-swap and ILP-based load balance method, it quickly finds and realizes load balancing in a lightweight manner. Tests have shown the effectiveness of SWAT using real trace data from Yahoo Video site, where the present method significantly reduces the SLO violations compared with no load balancing and migration-based load balancing.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A load balancing method for multi-tenant database system, load balancing method comprising:
   a. generating a replica swap operator to achieve a load transfer with minimal service interruption;
   b. determining an optimal set of swap operators that minimizes a total cost; and
   c. sequencing swap operators to minimize or avoid temporary overloads; wherein the sequencing includes swap operators $SW_i$, $1 \le i \le N_{sw}$ and servers $S_{sink}$ involved in $SW_i$, $1 \le i \le N_s$ and outputs a swap sequence for $j \leftarrow 1$ to $N_s$ where if Si has no outgoing edge swap then $S_j$ is added to the set $S_{sink}$, and while $S_{sink} \ne 0$ an incoming edge swap $SW_i$ is picked and appended to the swap sequence, $SW_i$ is removed from its destination server Sj and the source server $S_{j2}$, if $S_j$ has no incoming edge it is removed from Ssink and if $S_{j2}$ has no outgoing edge, it is added to $S_{sink}$.

2. The method of claim 1, wherein the determining the optimal set of swap operators comprises defining a cost of a swap operator based on write workload service interruption.

3. The method of claim 1, wherein the determining the optimal set of swap operators comprises formulating the optimal swap set as an integer linear programming (ILP) problem.

4. The method of claim 3, comprising formulating and solving a proactive load balancing problem.

5. The method of claim 3, comprising formulating and solving an ideal load fitting problem.

6. The method of claim 3, comprising formulating and solving a best-effort load fitting problem.

7. The method of claim 1, wherein the sequencing comprises formulating a traversal on a swap-server graph.

8. The method of claim 7, comprising generating a swap sequence that creates no temporary hotspots if there is no cycle in the swap server graph.

9. The method of claim 7, comprising detecting and breaking cycles in the swap-server graph to minimize a temporary hotspot.

10. The method of claim 1, comprising eliminating hotspots by finding a set of swaps that resolve the hotspots given a threshold, while minimizing a sum of secondary replicas' workload for swapped tenants.

* * * * *